United States Patent
Escobar et al.

(10) Patent No.: US 6,940,187 B2
(45) Date of Patent: Sep. 6, 2005

(54) ROBUST CONTROLLER FOR CONTROLLING A UPS IN UNBALANCED OPERATION

(75) Inventors: Gerardo Escobar, Stoughton, MA (US); Alex M. Stankovic, Boston, MA (US); Paolo Mattavelli, Padua (IT)

(73) Assignee: Northeastern University, Boston, MA (US)

( * ) Notice: Subject to any disclaimer, the term of this patent is extended or adjusted under 35 U.S.C. 154(b) by 462 days.

(21) Appl. No.: 10/203,950

(22) PCT Filed: Dec. 13, 2001

(86) PCT No.: PCT/US01/49028

§ 371 (c)(1),
(2), (4) Date: Aug. 14, 2002

(87) PCT Pub. No.: WO02/49185

PCT Pub. Date: Jun. 20, 2002

(65) Prior Publication Data

US 2003/0062774 A1 Apr. 3, 2003

Related U.S. Application Data

(60) Provisional application No. 60/255,654, filed on Dec. 14, 2000.

(51) Int. Cl.[7] .................................................. H02J 9/00
(52) U.S. Cl. .......................................... 307/64; 307/105
(58) Field of Search ....................... 307/64, 105; 363/39

(56) References Cited

U.S. PATENT DOCUMENTS

| 5,334,877 A | 8/1994 | Mohan et al. ................. 307/46 |
| 5,345,375 A | 9/1994 | Mohan ......................... 363/40 |
| 5,377,092 A | 12/1994 | Rowand, Jr. et al. .......... 363/41 |
| 5,526,252 A * | 6/1996 | Erdman ......................... 363/41 |
| 5,619,406 A | 4/1997 | Divan et al. ................... 363/98 |
| 6,295,216 B1 * | 9/2001 | Faria et al. .................... 363/44 |

OTHER PUBLICATIONS

"Transient Performance of UPS System with Synchronous–Frame Digital Controller," Su Chen and Geza Joos, Telecommunications Energy Conference, 2000. INTELEC. Twenty–Second International. Sep. 10–14, 2000, pp. 533–540.*

* cited by examiner

Primary Examiner—Robert L. Deberadinis
Assistant Examiner—Brett Squires
(74) Attorney, Agent, or Firm—Weingarten, Schurgin, Gagnebin & Lebovici LLP (57) ABSTRACT

A controller (236) for an uninterruptible power supply (UPS) compensates for harmonic distortion in the output current (224,26,228). The controller also provides a control vector (230) also with input from the adaptation processor (234).

40 Claims, 5 Drawing Sheets

ROBUST CONTROLLER FOR CONTROLLING A UPS IN UNBALANCED OPERATION

CROSS REFERENCE TO RELATED APPLICATIONS

This application claims the benefit of 60/255,654 filed on Dec. 14, 2000.

STATEMENT REGARDING FEDERALLY SPONSORED RESEARCH OR DEVELOPMENT

Part of the work leading to this invention was carried out with United States Government support provided under a grant from the Office of Naval Research, Grant No. N00014-97-1-0704. Therefore, the U.S. Government has certain rights in this invention.

BACKGROUND OF THE INVENTION

Uninterruptible Power Supplies (UPS) systems are integral and important components in modern electronic systems used by businesses and individuals. A UPS can be used to compensate for voltage sags in the line voltage, and may provide power to the various electronic and electrical systems coupled to it in the event that the line voltage suffers a voltage/current interruption. The quality of the power provided by a UPS system depends upon many factors. Some of these factors include the quality of the output voltage regulation, the total harmonic distortion introduced by the UPS into the power distribution system, the output impedance of the UPS, the response of the UPS to transient events in the line voltage, the operation of the UPS with uncertain parameters such as the load inductance and capacitance, and the operation of the UPS with non-linear/distorted loads. Feedback control systems that control the UPS voltage, frequency, and amplitude are often used to increase the quality of the UPS output.

Prior art controllers for a UPS include a single voltage control loop using proportional-integral (PI) control laws, using a dead-beat controller, a sliding mode controller, and nesting the output voltage and inductor current control loops inside one another, wherein the output voltage typically is a PI loop and he current loop typically is a high-gain loop. Although these controllers provide a sufficient response to many transient disturbances, these controllers do not effectively compensate for harmonic distortion on the output voltage due to non-linear/distorted loads.

It would be advantageous therefore to provide a controller for a UPS that compensates for the harmonic distortion due to non-linear/distorted loads and that is easy to construct, globally stable, and ideally is a linear time invariant system.

BRIEF SUMMARY OF THE INVENTION

A method and apparatus for generating a control algorithm or law for an Uninterrupted Power Supply (UPS) is disclosed. The controller provides for tracking a three-phase sinusoidal reference signal and the suppression of harmonic signals present on the UPS output such that the output of the UPS is balanced. The controller measures the current in each phase in each corresponding series inductor, measures the output voltage across each corresponding parallel capacitor, and determines a control vector therefrom. The control vector being provided to the UPS. The control vector includes two components that generated by two processors and are combined together. The first component is a proportional gain control signal that is generated by a proportional gain processor. The second component is a filtered control signal that is generated by a harmonic compensator processor.

Due to uncertainties in the components that make up the UPS and in the load, an adaptation processor is used to estimate certain quantities. In particular, the adaptation processor estimates the coefficients of a pre-selected group of harmonics that are present in the output current. The coefficients are provided to the harmonic compensator and used by the harmonic compensator to suppress a selected group of harmonic signals that may be present in the output current. In one embodiment, the adaptation processor also estimates the value of the series inductance corresponding to each phase. The estimated series inductance is provided to the proportional gain processor and the harmonic compensator and used by each in determining the proportional gain control signal and the filtered control signal.

In another embodiment, a predetermined value of the series inductance is provided to the proportional gain processor and the harmonic compensator and used by each in determining the proportional gain control signal and the filtered control signal. As a result, the controller turns out to be linear time invariant (LTI). The value of the series inductance is selected to ensure that the controller is robust in the sense that it is globally stable under parameter uncertainties and in the presence of large signals. In one embodiment, the harmonic compensators are second order resonant filters that make use of the estimated coefficients of the pre-selected group of harmonics. All calculations in the adaptation processor and the control vector processor are carried out in stationary $\alpha$, $\beta$ coordinates instead of three-dimensional phase coordinates.

Other forms, features, and aspects of the above-described methods and system are described in the detailed description that follows.

BRIEF DESCRIPTION OF THE SEVERAL VIEWS OF THE DRAWING

The invention will be more fully understood from the following detailed description taken in conjunction with the accompanying drawings in which.

DETAILED DESCRIPTION OF THE INVENTION

Figure 1:
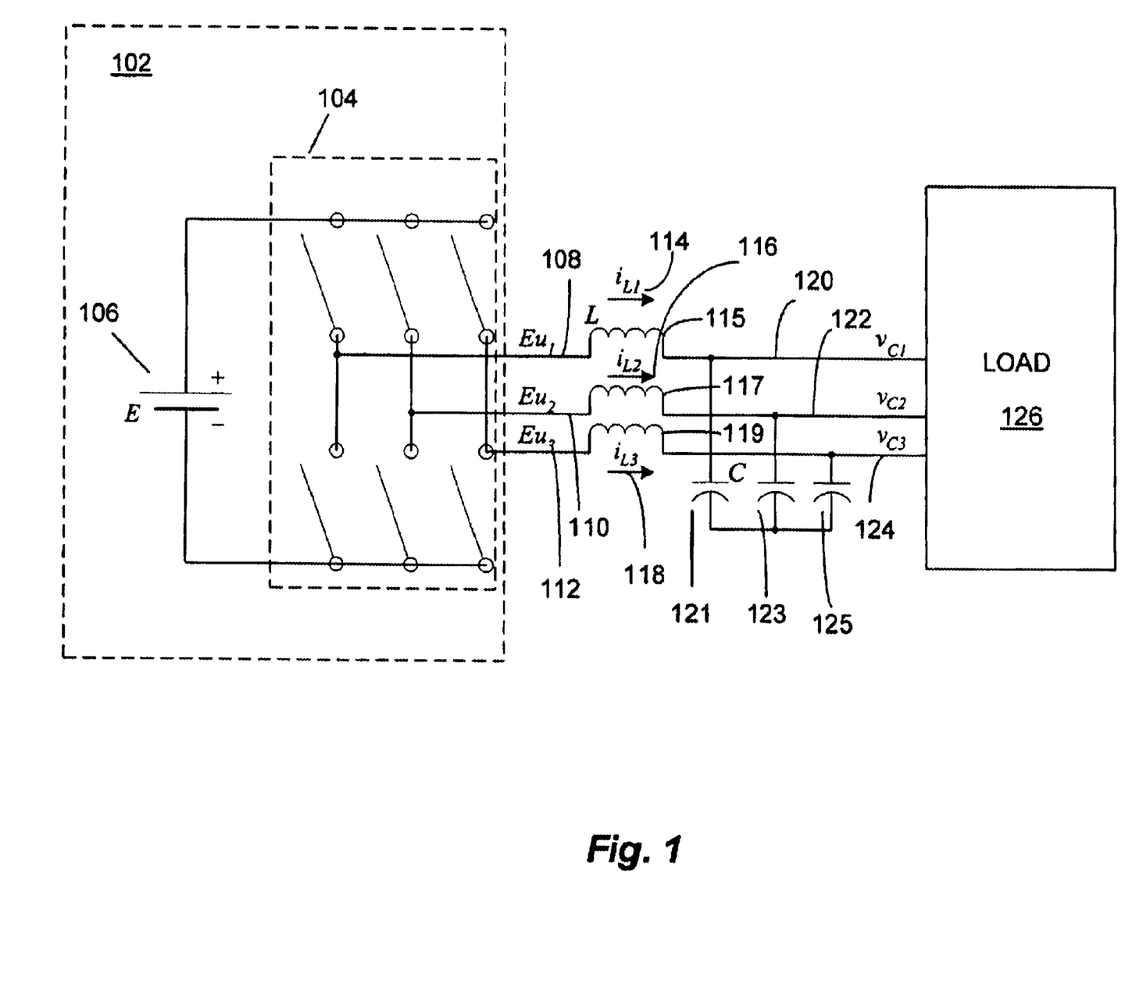
FIG. 1 is a schematic diagram of a prior art Uninterrupted Power Supply (UPS)

FIG. 1 depicts a basic Uninterruptible Power Supply (UPS) system. In particular, the UPS 102 includes a six switch three-phase voltage source inverter (VSI) 104 coupled to a DC voltage source 106 that has a voltage magnitude of E volts. The VSI 104 switches the six switches on and off in a controlled manner to provide a switched sinusoidal voltage output on each phase. Under a balanced load condition each of the three phases will have voltage and current equal to the other two phases, separated by a given phase angle. In the embodiment illustrated in FIG. 1 the UPS provides a voltage output for 3 phases that will be phased approximately one-hundred-twenty degrees of phase apart. For each phase, the UPS voltage $Eu_1$, $Eu_2$, and $Eu_3$ at nodes 108, 110, and 112 respectively are filtered by a resonant LC filter corresponding to that particular phase. In the embodiment depicted in FIG. 1 a series inductor 115 and parallel capacitor 121 filter the voltage $Eu_1$ to provide an output voltage $v_{C1}$ at node 120. A series inductor 117 and parallel capacitor 123 filter the voltage $Eu_2$ to provide an output voltage $v_{C2}$ at node 122. A series inductor 119 and parallel capacitor 125 filter the voltage $Eu_3$ to provide an output voltage $v_{C3}$ at node 124. However, the filtering of each of the voltages $Eu_1$, $Eu_2$, and $Eu_3$ is not perfect since the actual value of the series inductance and parallel capacitance for each phase is affected by the parasitic inductance and capacitance inherent in the power distribution system and the load. In particular, the cables used in the power distribution network and the parasitic inductances between the cables affect the value of the series inductance in each phase. If the load for each phase has different values of inductance, capacitance, or resistance the load will be unbalanced and harmonic distortion can result. In general, the value of the series inductance and the parallel capacitance for each phase are therefore either unknown constants or are values that slowly vary over time. Output current $i_{O1}$, $i_{O2}$, and $i_{O3}$ are currents 138, 140, and 142 respectively and inductor currents $i_{L1}$, $i_{L2}$, and $i_{L3}$ are currents 114, 116, and 118. The system dynamics for the UPS in FIG. 1 are given by:

$$\frac{d}{dt}i_L = -\frac{1}{L}v_C + \frac{E}{L}u \quad (1)$$

$$\frac{d}{dt}v_C = \frac{1}{C}(i_L - i_O)$$

where $i_L$, $v_C$, u, and $i_O$ are all vector quantities of the form $X=[x\alpha, x\beta]^T$ expressed in stationary $\alpha$, $\beta$ coordinates, and parameters L, C, E, are discussed above. The output current, $i_O$, is an unbalanced signal that can be expressed as a combination of a fundamental component, at a fixed frequency $\omega$, and one or more preselected harmonics. Thus, $i_O$ can be expressed as:

$$i_O = \sum_{k \in H} e^{J\omega k t} I_{O,k}^p + \sum_{k \in H} e^{-J\omega k t} I_{O,k}^n \quad (2)$$

where the vectors $I^p_{O,k}, I^n_{O,k} \in R^2$ and are the $k^{th}$ harmonic coefficients for the positive and negative sequences describing the output current $i_O$ and $H=\{1, 2, 3, \ldots\}$ is the set of pre-selected harmonic components of $i_O$, and $\Im=[[0, -1];[1, 0]]$. In general, the harmonic coefficients $I^p_{O,k}, I^n_{O,k}$ are also assumed to be unknown constants, or values that slowly change over time.

Figure 2:
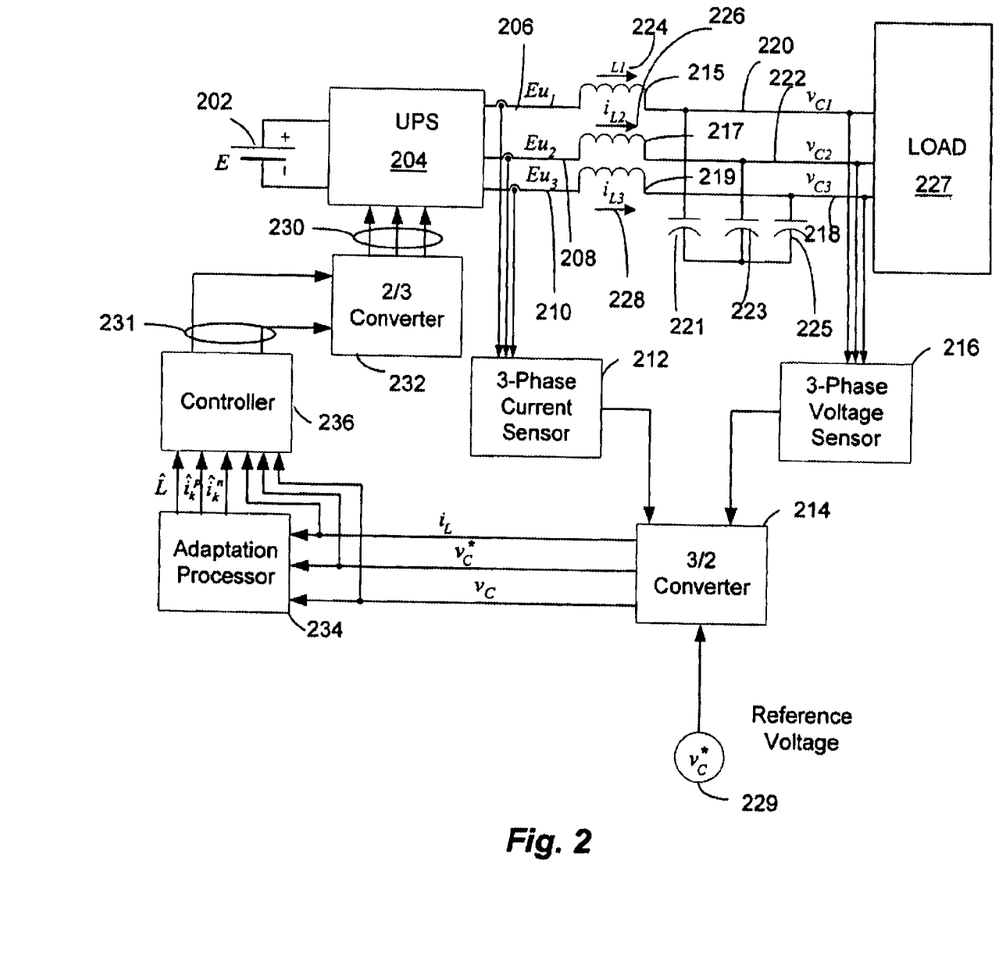
FIG. 2 is a block diagram of a controller suitable for use with the control algorithm described herein.

FIG. 2 depicts a block diagram of a controller suitable for executing the control laws described herein. In particular, FIG. 2 includes a UPS system that includes a DC voltage 202 that is coupled to a UPS 204. The UPS 204 receives a three phase control vector 230 from 3/2 converter 232 connected to a controller 236. The UPS 204 is responsive to the control vector 230 by providing a three phase output control voltages consisting of output voltages $Eu_1$, $Eu_2$, and $Eu_3$. Series inductors 215, 217, and 219 each correspond to an output phase and form part of the resonant filter as described above with respect to FIG. 1. The actual value of the series inductors 215, 217, and 219 are not known since each series inductor also includes the unknown parameters of the power distribution system and load. Each of the inductors 215, 217, and 219 have corresponding inductor currents $i_{L1}$ 224, $i_{L2}$ 226, and $i_{L3}$ 228. Parallel capacitors 221, 223, and 225 each correspond to an output phase and form a part of the resonant filter as described above with respect to FIG. 1. The actual values of each parallel capacitors 221, 223, and 225 are not known since each parallel capacitor includes unknown parameters of the power distribution network and a load 227. An output voltage is taken across each capacitor $v_{c1}$ 220, $v_{c2}$ 222, and $v_{c3}$ 218.

A three-phase current sensor 212 detects and measures the inductor current 224, 226, and 228 in each phase and provides the three current measurement signals to a 3/2 three-phase to stationary coordinate transformation module (3/2 converter) 214. Alternatively, an estimator may be constructed to estimate the inductor current in each phase and provide the estimated three current estimates to the 3/2 converter 214. The 3/2 converter 214 provides the inductor current as a two dimensional representation of the inductor current in $\alpha$ and $\beta$ stationary coordinates. Similarly, a three-phase voltage sensor 216 detects and measures the output voltage 220, 222, and 218 across each of the three parallel capacitors 221, 223, and 225 respectively, and provides the three voltage measurements to the 3/2 converter 214. Alternatively, an estimator may be constructed to estimate the voltage in each phase and provide the estimated three voltage estimates to the 3/2 converter 214. The 3/2 converter 214 provides the output voltage as a two dimensional representation of the output voltage in $\alpha$ and $\beta$ stationary coordinates. A three-phase reference voltage 229 having a magnitude of $v_C^*$ that is a purely sinusoidal voltage having only a fundamental frequency with substantially no harmonic distortion provides the three-phase reference voltages to the 3/2 converter 214. The 3/2 converter 214 provides the reference voltage as a two dimensional representation of the three-phase reference voltage in a and A stationary coordinates.

An adaptation processor 234 is coupled to the 3/2 converter 214 and receives both the output voltage and the reference voltage in stationary coordinates from the 3/2 converter 214. As will be explained in more detail below, the adaptation processor 234 estimates the harmonic components contained in the inductor current in $\alpha$ and $\beta$ stationary coordinates and in one embodiment, also estimates the series inductance values in stationary coordinates.

A control processor 236 is coupled to the adaptation processor 234 and receives the estimated values therefrom. The control processor 236 further receives the output voltage, the inductor current, and the reference voltage in stationary coordinates from the 3/2 converter 214. In one embodiment, the control processor 236 utilizes the inductor current, the output voltage, the reference voltage, and the estimates of the harmonic components and series inductance value in stationary coordinates, to compute an output control vector 231 in stationary coordinates which is converted into a three phase control signal 230 by the 2/3 converter 232. In another embodiment, the control processor does not use the estimated series inductance value, but rather a predetermined inductance value is selected that will provide robust stability for the controller.

Figure 3:
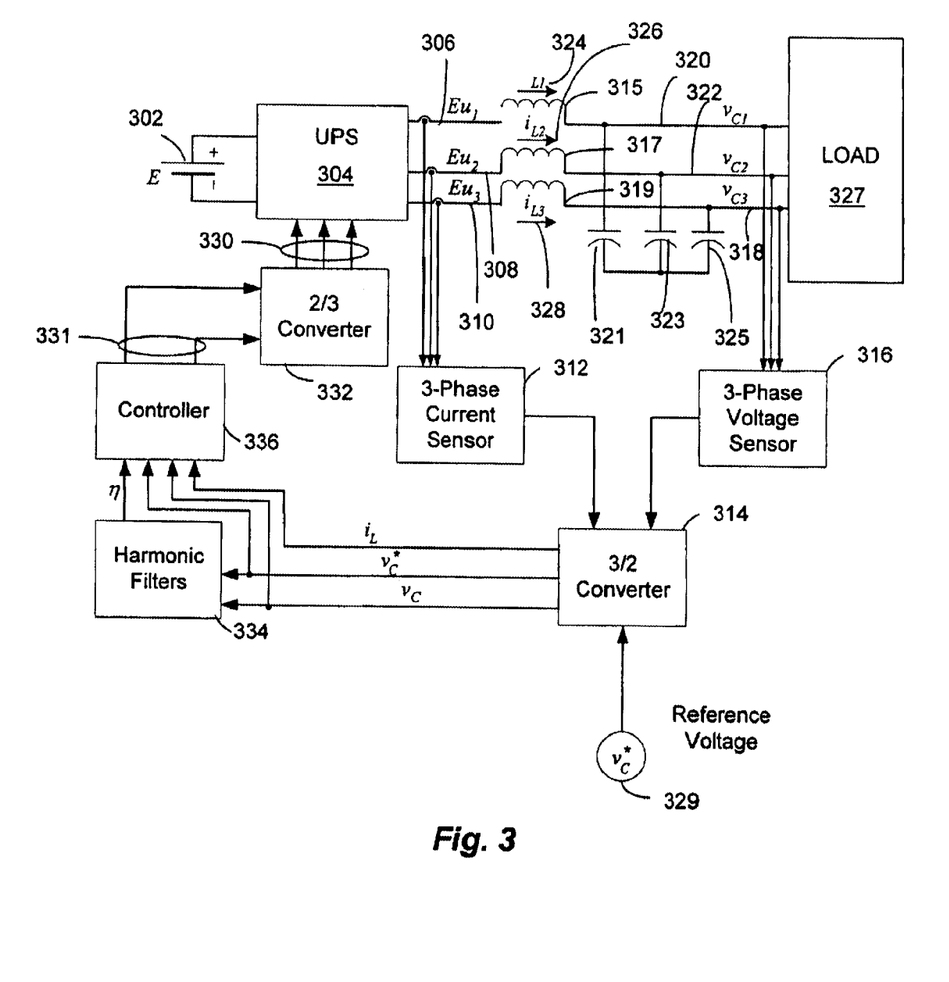
FIG. 3 is a block diagram of a controller suitable for use with the control algorithm described herein.

FIG. 3 depicts the block diagram of such an embodiment, where the adaptive processor 234 of FIG. 2 is replaced by a plurality of harmonic filters 334. The plurality of harmonic filters 334 utilize the output voltage and the reference voltage in stationary coordinates provided by the 3/2 converter 314 to produce a periodic signal containing the pre-selected compensating harmonic signals. The controller 336 utilizes the a periodic signal plus the inductor current, the output voltage and the reference voltage in stationary coordinates provided by the 3/2 converter 314 to compute an output control vector 330 in stationary coordinates that is then converted into the three phase signal 330 by the 2/3 converter 332. The other components operate as described above with respect to FIG. 2.

The control objective of the controller 236 (336) described herein is to provide control voltages, $Eu_1$ 206 (306), $Eu_2$ 208 (308), and $Eu_3$ 210 (310) that track the balanced sinusoidal reference voltage $v^*_C$ 229 (329). The equilibrium point for the controller 236 and 336 depicted in FIGS. 2 and 3 is given by:

$$\bar{i}_L = i_O + \Im \omega C v_C^* \quad (3)$$

As discussed above, the reference voltage $v_C^*$ 229 (329) is purely sinusoidal and consists only of the fundamental frequency with no harmonics. Thus, the inductance current provides the values of the pre-selected harmonic components of the load current. The system of equations in equation 1 may be written as:

$$L\frac{d}{dt}\tilde{i}_L = -\tilde{v}_C + Eu - v_C^* - L\frac{d}{dt}\tilde{i}_L^* \quad (4)$$

$$C\frac{d}{dt}\tilde{v}_C = \tilde{i}_L + \tilde{i}_L^* - (i_O + \Im\omega C v_C^*)$$

where $Eu$ is the proposed controller to be discussed in more detail below, and $\tilde{i}_L = i_L - \tilde{i}_L$, $\tilde{v} = v_C - v_C^*$, and $$\frac{d}{dt}v_C^* = \Im\omega v_C^*.$$

A control law suitable for providing a UPS with a suitable control vector is given by:

$$Eu = -R_1(i_L - \hat{i}_L) - R_2\tilde{v}_C + v_C^* + \hat{L}\frac{d}{dt}\hat{i}_L \quad (5)$$

where $\hat{\ }$ indicates an estimated quantity, and $\tilde{i}_L = i_L - \hat{i}_L$ is redefined, and where $\hat{i}_L$ is being used as the estimate for $\bar{i}_L$. Using the control law in Eq. (5), the closed loop dynamics are given by:

$$L\frac{d}{dt}\tilde{i}_L = -R_1\tilde{i}_L - (1 + R_2)\tilde{v}_C + \tilde{L}\frac{d}{dt}\hat{i}_L \quad (6)$$

$$C\frac{d}{dt}\tilde{v}_C = \tilde{i}_L + \varepsilon_L$$

where $\tilde{L} = \hat{L} - L$. Let $\bar{i}_L = i_O + \Im\omega C v_C^*$ be an unknown signal that has the form:

$$\bar{i}_L = \sum_{k \in H} e^{\Im\omega kt} \bar{I}_{L,k}^p + \sum_{k \in H} e^{-\Im\omega kt} \bar{I}_{L,k}^n \quad (7)$$

where $\bar{i}_L$ has inherited the form of $i_O$ in equation (3). An estimate of this signal represented by $\hat{i}_L$ is $$\hat{i}_L = \sum_{k \in H} e^{\Im\omega kt} \hat{I}_{L,k}^p + \sum_{k \in H} e^{-\Im\omega kt} \hat{I}_{L,k}^n \quad (8)$$

where $\hat{I}_{L,k}^p$ and $\hat{I}_{L,k}^n$ are estimates for $\bar{I}_{L,k}^p, \bar{I}_{L,k}^n$ respectively. The estimation error signal $\varepsilon_L = \hat{i}_L - \bar{i}_L$ becomes:

$$\varepsilon_L = \sum_{k \in H} e^{\Im\omega kt} \varepsilon_{L,k}^p + \sum_{k \in H} e^{-\Im\omega kt} \varepsilon_{L,k}^n \quad (9)$$

where $\varepsilon_{L,k}^p = \hat{I}_{L,k}^p - \bar{I}_{L,k}^p$ and $\varepsilon_{L,k}^n = \hat{I}_{L,k}^n - \bar{I}_{L,k}^n$. Estimation of the 3 unkown parameters is carried out by the following adaptive laws:

$$\dot{\hat{I}}_{L,k}^p = -\gamma_k e^{-\Im\omega kt} \tilde{v}_C \quad (10)$$

$$\dot{\hat{I}}_{L,k}^n = -\gamma_k e^{\Im\omega kt} \tilde{v}_C$$

$$\dot{\hat{L}} = -\gamma_0 \hat{i}_L^T \frac{d}{dt}\hat{i}_L$$

These adaptive laws can be shown to be globally stable in large signal sense. These adaptive laws are non-linear and can be complex to implement. Accordingly the complexity of the adaptive laws can be reduced if rotation matrices of the form $e^{\Im\omega kt}$ can be avoided. The following coordinate transformation is used to eliminate the $e^{\Im\omega kt}$ term:

$$\hat{i}_{L,k}^p = e^{\Im\omega kt}\hat{I}_{L,k}^p$$

$$\hat{i}_{L,k}^n = e^{-\Im\omega kt}\hat{I}_{L,k}^n \quad (11)$$

and therefore $$\hat{i}_L = \sum_{k \in H} (\hat{i}_{L,k}^p + \hat{i}_{L,k}^n) \quad (12)$$

The time derivatives of the transformed estimates are given by:

$$\frac{d}{dt}\hat{i}_{L,k}^p = -\gamma_k \tilde{v}_C + \Im k\omega \hat{i}_{L,k}^p \quad (13)$$

$$\frac{d}{dt}\hat{i}_{L,k}^n = -\gamma_k \tilde{v}_C - \Im k\omega \hat{i}_{L,k}^n$$

The time derivative of $\hat{i}_L$ used in the controller in (5) is computed as:

$$\frac{d}{dt}\hat{i}_L = \sum_{k \in H}\left(\frac{d}{dt}\hat{i}_{L,k}^p + \frac{d}{dt}\hat{i}_{L,k}^n\right) = -2\tilde{v}_C\sum_{k \in H}\gamma_k + \sum_{k \in H}\Im k\omega(\hat{i}_{L,k}^p - \hat{i}_{L,k}^n) \quad (14)$$

The expression for the adaptive controller (5) in terms of the new variables is given by:

$$Eu = -R_1 i_L - \left(2\hat{L}\sum_{k \in H}\gamma_k + R_2\right)\tilde{v}_C + \quad (15)$$

$$v_C^* + \sum_{k \in H}\left[(R_1 + \Im k\omega\hat{L})\hat{i}_{L,k}^p + (R_1 - \Im k\omega\hat{L})\hat{i}_{L,k}^n\right]$$

Figure 4:
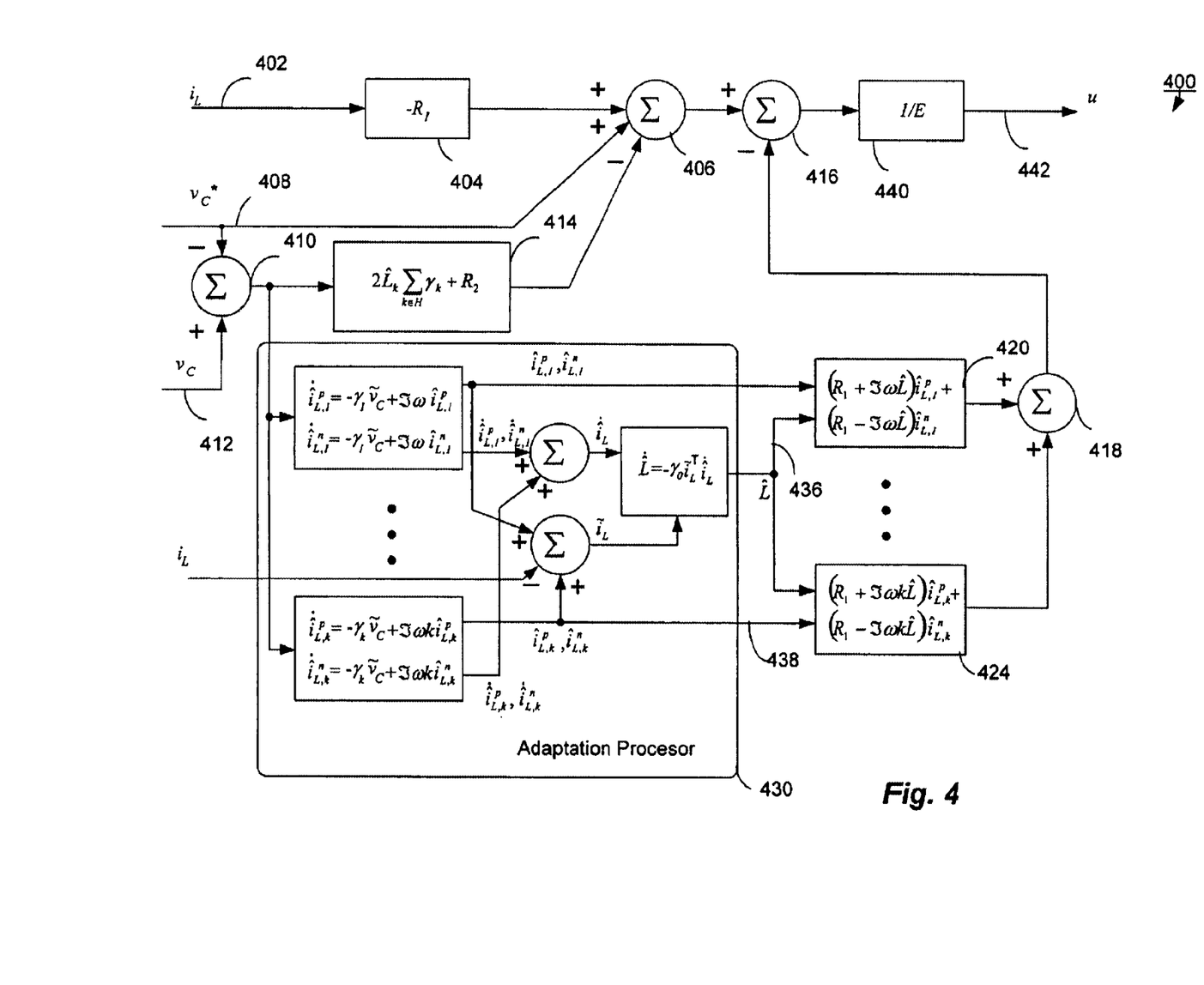
FIG. 4 is a block diagram of another embodiment of the control algorithm described herein.

The controller provided in (15) is non-linear due to the inclusion of the estimated inductance term and the associated dynamics in the second and fourth terms of Eq. (15). FIG. 4 depicts a block diagram of a realization of the adaptive control law of Eq. (15). In FIG. 4 and in the description that follows, all values are assumed to be two-dimensional vectors in α β stationary coordinates. In particular FIG. 4 depicts, a controller 400 implementing the control law of Eq. (15) and includes the measured inductor current $i_L$ as an input signal on line 402, the reference voltage $v^*_C$ as an input on line 408 and the measured output voltage $v_C$ as an input on line 412, where as above, the * indicates a reference signal. The input inductor current on line 402 is multiplied in module 404 by a first constant $R_1$ to form a first proportional control term. The reference voltage $v^*_C$ on line 408 forms a feedforward control term. A second proportional control term 414 is a function of the difference between the reference voltage $v^*_C$ on line 408 and the measured output voltage $v_C$ on line 412 formed by difference module 410. In particular, the second proportional control term 414 is the difference formed by difference module 410 multiplied by a constant $$\left(2\hat{L}\sum_{k \in H} \gamma_k + R_2\right).$$

This constant includes the design parameter $R_2$, which is greater than zero and selected for system stability. The plurality of $\gamma_k$ are also predetermined design constants. Each one of the plurality of $\gamma_k$ constants correspond to a corresponding one of the pre-selected harmonic components of the load current. The value of each individual $\gamma_k$ is selected according to the desired compensation of the particular harmonic component. The adaptation processor 430, which executes the equations in (10) (12), and (13) operates as described above with respect to FIGS. 2 and 3, estimates the value of the series inductance via Eq (10), wherein the time derivative of the inductor current $i_L$ is provided by Eq. (14), and the necessary estimates of the pre-selected harmonic components are determined according to Eq. (13). The proportional gain term is formed in summing module 406 and is equal to the sum of the first proportional gain term and the feedforward term minus the second proportional gain term.

A plurality of k harmonic compensators 420 to 424 of the form $[(R_1+\Im k\omega \hat{L})\hat{i}_{L,k}{}^p+(R_1-\Im k\omega \hat{L})\hat{i}_{L,k}{}^n]$ are used to provide a harmonic compensated control signal that is used in the formation of the control vector 442, u. The plurality of k harmonic compensators 420-424 receives the estimated series inductance value and the estimated harmonic components of the pre-selected k harmonics as an input signal, and provides as an output a harmonic compensated signal. As discussed above, the adaptation processor 430, which operates as described above with respect to FIGS. 2 and 3, estimates the value of the series inductance via Eq (10), wherein the time derivative of the inductor current estimate $\hat{i}_L$ is provided by Eq. (14), and the necessary estimates of the pre-selected harmonic components are determined according to Eq. (13). A harmonic compensated gain term is formed by the summing module 418 and is equal to the sum of the outputs from each of the plurality of k resonant compensators 420–424. The control vector 442, u, is formed by summing module 416 by subtracting the harmonic compensated gain term from the proportional gain term and dividing the resulting difference in module 440 by E, where E is value of the DC voltage driving the UPS.

As can be seen, the realization of the control law in Eq. (15) is a complex and non-linear computation. There would be a considerable reduction in the complexity of the control law in Eq. (15) and depicted in FIG. 4 if the adaptation calculations were reduced. Since the estimate of the series inductance is the most non-linear term, the controller in (15) can be significantly simplified if the estimation of the inductance L is avoided. Substituting a predetermined value $L_0$ for the estimate of L provides a control law given by:

$$Eu = -R_1 i_L - \left(2L_0 \sum_{k \in H} \gamma_k + R_2\right)\tilde{v}_C + \qquad (16)$$

$$v_C^* + \sum_{k \in H}\left[(R_1+\Im k\omega L_0)\hat{i}_{L,k}^p + (R_1-\Im k\omega L_0)\hat{i}_{L,k}^n\right]$$

The adaptations are now reduced to solving the two equations for the estimate of the pre-selected harmonic components in Eq. (13). The closed loop system is then given by:

$$L\frac{d}{dt}i_L = -R_1 i_L + \sum_{k \in H}\left[(R_1+\Im k\omega L_0)\hat{i}_{L,k}^p + (R_1-\Im k\omega L_0)\hat{i}_{L,k}^n\right] - \qquad (17)$$

$$\left(1+R_2+2L_0\sum_{k \in H}\gamma_k\right)(v_C-v_C^*)$$

$$C\frac{d}{dt}v_C = i_L - i_0 \qquad (18)$$

$$\frac{d}{dt}\hat{i}_{L,k}^p = -\gamma_k(v_C-v_C^*) + \Im k\omega \hat{i}_{L,k}^p \qquad (19)$$

$$\frac{d}{dt}\hat{i}_{L,k}^n = -\gamma_k(v_C-v_C^*) - \Im k\omega \hat{i}_{L,k}^n$$

Since the adaptation terms in equations (17)–(19) no longer include the value of the series inductance estimate $\hat{L}$, the parameter $L_0$ must be selected such that the closed loop system is stable despite variations in the actual value. The system defined by equations (17)–(19) can be shown to be globally stable if the value of $L_0$ is selected such that:

$$L_0 > L_{max} \qquad (20)$$

Where $L_{max}$ is the upper bound for the series inductance L.

The controller expression (16) along with the expressions of the adaptations (13) can be expressed in a more familiar form by transforming the variables as:

$$\eta_k^p = -(R_1+k\omega L_0 \Im)\hat{i}_{L,k}^p \qquad (21)$$

$$\eta_k^n = -(R_1-k\omega L_0 \Im)\hat{i}_{L,k}^n \qquad (22)$$

where the time derivatives are given by:

$$\dot{\eta}_k^p = (R_1+\Im k\omega L_0)\gamma_k \tilde{v}_C + \Im k\omega \eta_k^p \qquad (23)$$

$$\dot{\eta}_k^n = (R_1+\Im k\omega L_0)\gamma_k \tilde{v}_C + \Im k\omega \eta_k^n \qquad (24)$$

This yields the following expression for a linear time invariant (LTI) control law given by:

$$Eu = -R_1 i_L - \left(2L_0\sum_{k \in H}\gamma_k + R_2\right)\tilde{v}_C + v_C^* - \sum_{k \in H}(\eta_k^p + \eta_k^n) \qquad (25)$$

By expressing the dynamical part of the controller in the form of a transfer function, the controller in equation (25) can be rewritten as:

$$Eu = -R_1 i_L - \left(2L_0\sum_{k \in H}\gamma_k + R_2\right)\tilde{v}_C + v_C^* - \sum_{k \in H}2\gamma_k \tilde{v}_C\left(\frac{R_1 s - k^2\omega^2 L_0}{s^2 + k^2\omega^2}\right) \qquad (26)$$

where s is the complex variable.

Figure 5:
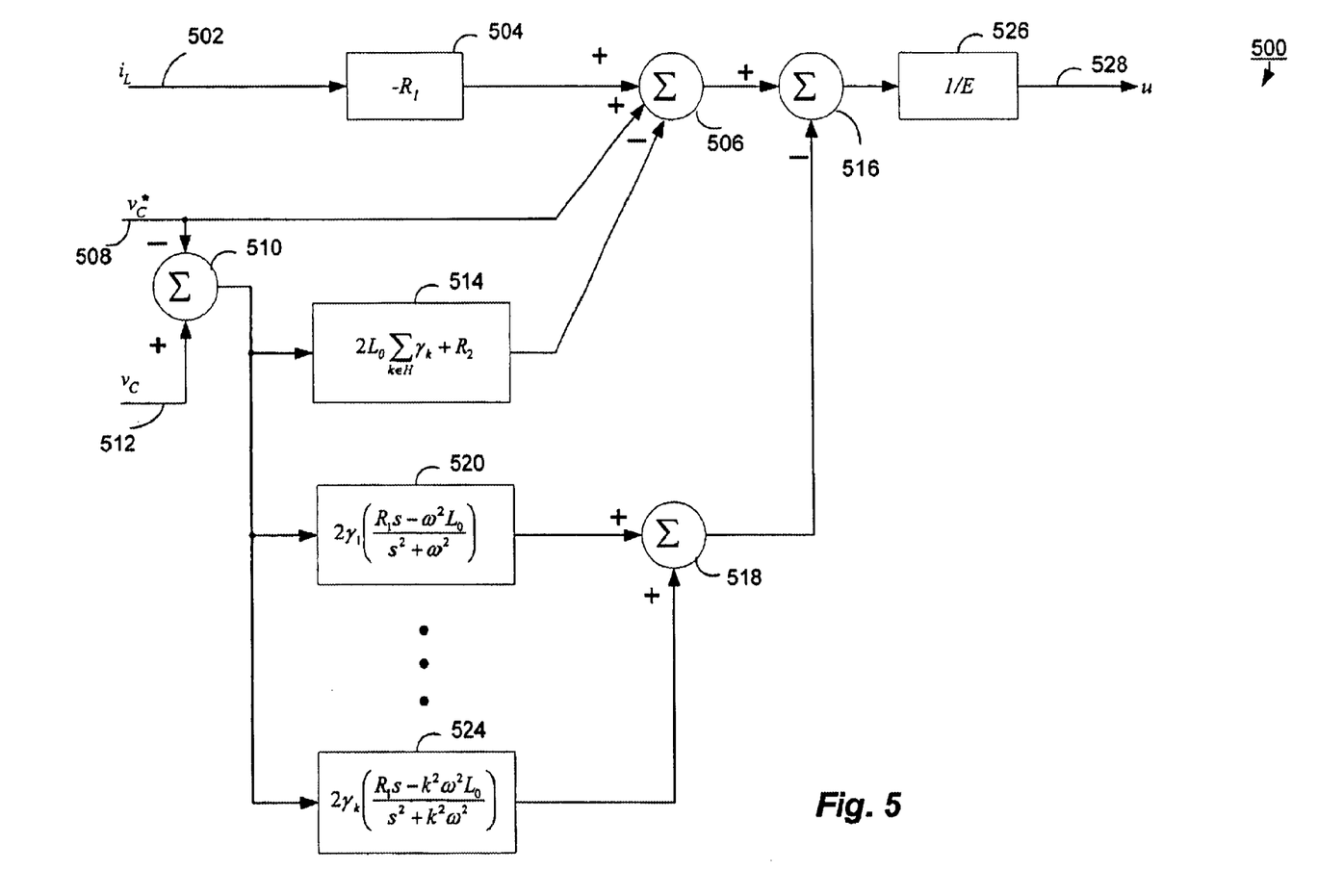
FIG. 5 is a block diagram of another embodiment of the control algorithm described herein.

FIG. 5 depicts a realization of the control law of Eq. (26). In the description that follows, all values are assumed to be two-dimensional vectors in α β stationary coordinates. In particular, a controller 500 implementing the control law of Eq. (26) includes the measured inductor current $i_L$ as an input on line 502, the reference voltage $v^*_C$ as an input on line 508 and the measured output voltage $v_C$ as an input on line 512, where as above, the * indicates a reference signal. The input inductor current $i_L$ on line 502 is multiplied by a first constant 504, $R_1$, to form a first proportional control term. A feedforward control term is the input reference voltage $v^*_C$ on line 508 is added to the first proportional control term via summing module 506. A second proportional control term is a function of the difference between the reference voltage $v^*_C$ on line 508 and the measured output voltage $v_C$ on line 512 formed by difference module 510. This difference is multiplied by a constant $$\left(2L_0 \sum_{k \in H} \gamma_k + R_2\right),$$

514. This constant includes the design parameter $R_2$, which is greater than zero and selected for system stability. The plurality of $\gamma_k$ are also predetermined design constants. Each one of the plurality of $\gamma_k$ constants correspond to a corresponding one of the pre-selected harmonic components of the load current. The value of each individual $\gamma_k$ is selected according to the desired compensation of the particular harmonic component. As discussed above the value of $L_0$ is selected to ensure system stability and is not estimated. A proportional gain term is formed by summing module 506 by adding the first proportional gain term plus the feedforward term and subtracting the third proportional gain term therefrom.

A plurality of k harmonic filters 520–524 receive as an input the difference between the reference voltage $v^*_C$ on line 508 and the measured output voltage $v_C$ on line 512 from difference module 510. Each one of the plurality of k harmonic filters 520–524 provide a filtered control signal component as an output, wherein the resonant frequency of each of the filters is given by $s^2+k^2\omega^2$, where k is the $k^{th}$ pre-selected harmonic. A filtered control signal is obtained by summing the plurality of k filtered control signal component from each of the harmonic filters 520–524 in summing module 518. The control vector, 528, u is formed by summing module 516 by subtracting the filtered control signal from the proportional gain term and dividing the difference in module 526 by the value of the DC voltage source driving the UPS, E.

For the embodiment depicted in FIGS. 4 and 5 the sensing of the inductor current and the output voltages is performed using current and voltage measurement techniques known in the art or the current and voltage values can be computed by an estimator constructed according to the system dynamic equations as is known in the art. The computing power required, however, is greater since each of the harmonic compensators of FIG. 3 and each of the harmonic filters of FIG. 5 require two of each compensator or filter; one for the α component and one for the β component. In one embodiment, the value of $R_1$ can be set as $R_1=k_{ip}*I_2$ ($I_2$ is the 2 by 2 identity matrix), where $k_{ip}$ is a conventional proportional gain of a PI controller. Accordingly, $k_{ip}$ can be set equal to $2\pi f_{ic}L$, where $f_{ic}$ is the current loop bandwidth, usually $1/10$–$1/14$ of the switching frequency. Parameter $L_0$ can be set equal to L. $R_2$ can be set as $R_2=k_{vp}*I_2$ where $K_{vp}$ is a conventional proportional gain of a PI voltage controller in a multi-loop solution. Finally, the gains $\gamma_k$ can be set to compensate the remaining transfer function that can be roughly approximated as a first order pole at the desired voltage loop bandwidth with a DC gain equal to $1/k_{vp}$. Disregarding the influence of such a pole, we can set each of the gains $\gamma_k$ as $\gamma_k=2.2*k_{vp}/T_{kr}$, where $T_{kr}$ is the desired response time for each of the preselected harmonic components, as evaluated between the 10% and 90% of a step response of the amplitude of the corresponding sinusoidal perturbation.

Those of ordinary skill in the art should further appreciate that variations to and modification of the above-described methods and apparatus for controlling a UPS can be made. In particular, some measurements can be replaced with their estimates, as in the case of current estimates from measured DC-link current and from known switching pattern. Accordingly, the invention should be viewed as limited solely by the scope and spirit of the appended claims.

What is claimed is:

1. A controller for a three-phase uninterrupted power supply (UPS), the three-phase UPS providing power to a three-phase load via a series inductor for each phase and a capacitor connected electrically in parallel to the load for each phase, the three-phase UPS providing a voltage E, an output voltage $v_C$, an inductor current $i_L$, and a load current $i_0$ for each phase, the controller comprising:

an inductor current module operative to to provide the inductor current value in each phase;

a voltage module operative to provide the output voltage, V, in each phase;

a three-phase to stationary coordinate converter operative to convert the measured inductor current and the measured output voltage in each phase into a inductor current in stationary coordinates and a output voltage in stationary coordinates respectively, and to convert a received reference voltage in each phase into a reference voltage in stationary coordinates;

an adaptation processor coupled to the three-phase-to-stationary-coordinate-converter and receiving the output voltage and the reference voltage therefrom, the adaptive portion configured and arranged to calculate an estimate of a plurality of pre-selected harmonic components of the inductor current in stationary coordinates and to calculate an estimate of the value of the series inductor corresponding to each phase, and to convert the estimate of the value of the series inductor corresponding to each phase into stationary coordinates;

a control vector processor coupled to the three-phase-to-stationary-coordinate-converter and to the adaptation processor, the control vector processor receiving the inductor current, the output voltage, and the reference voltage from the three-phase to stationary coordinate converter, and receiving the estimate of a plurality of pre-selected harmonic components of the inductor current in stationary coordinates and the estimate of the series inductance from the adaptation processor;

the control vector processor including a proportional gain processor, the proportional gain processor configured and arranged to provide a proportional gain term as a function of the inductor current, the output voltage, the reference voltage, and the estimated inductance;

the control vector processor further including a harmonic compensator processor, the harmonic compensator processor configured and arranged to determine a harmonic compensated control signal as a function of the plurality of estimated pre-selected harmonic components of the inductor current in stationary coordinates and the estimate of the series inductance, reference voltage, the output voltage;

the control vector processor providing a control output vector that is a function of the harmonic compensated control signal and the proportional control signal.

2. The controller of claim 1 wherein the proportional gain processor includes:

a first constant multiplied by the inductor current forming a first product value;

a second constant multiplied by the reference voltage forming a second product value;

a first difference module forming a first difference value equal to the difference between the output voltage and the reference voltage;

a first factor multiplied by the first difference value forming a third product value;

a second difference module providing a proportional gain control signal that is the difference between the sum of the first and second product value and the third product value.

3. The controller of claim 2 wherein the first constant is a first predetermined design constant that is greater than zero.

4. The controller of claim 2 wherein the second constant is one.

5. The controller of claim 2 wherein the first factor is the estimated series inductance value multiplied by the sum of a first plurality of predetermined design constants, plus a second predetermined design constant, wherein each of the first plurality of predetermined design constants corresponds to one of the pre-selected harmonic components.

6. The controller of claim 2 wherein the harmonic compensator processor is coupled to the first difference module and receiving the first difference value therefrom, the harmonic compensator including a plurality of harmonic compensators, each of the plurality of harmonic compensators configured and arranged to use a corresponding one of the estimated plurality of harmonic components to compensate the received first difference value for a corresponding one of the plurality of pre-selected harmonic components, wherein each of the plurality of harmonic compensators providing a compensated signal, and wherein the harmonic compensator processor providing a harmonic compensated control signal that is the sum of the plurality of compensated signals;

wherein the control vector processor providing a control output vector that is the difference between the proportional gain control signal and the harmonic compensated control signal.

7. The controller of claim 1 wherein the inductor current module is an inductor current sensor.

8. The controller of claim 1 wherein the inductor current module is an inductor current estimator.

9. The controller of claim 1 wherein the voltage module is a voltage sensor.

10. The controller of claim 1 wherein the voltage module is a voltage estimator.

11. A controller for a three-phase uninterrupted power supply (UPS), the three-phase UPS providing power to a three-phase load via a series inductor for each phase and a capacitor connected electrically in parallel to the load for each phase, the three-phase UPS providing a voltage E, an output voltage $v_C$, an inductor current $i_L$, and a load current $i_0$ for each phase, the controller comprising:

an inductor current module operative to provide the inductor current in each phase;

a voltage module operative to provide the output voltage, $v_C$, in each phase;

an output current module operative to provide the output current in each phase;

a three-phase to stationary coordinate converter operative to convert the measured inductor current, the measured output voltage in each phase into a inductor current in stationary coordinates and a output voltage in stationary coordinates respectively, and to convert a received reference voltage in each phase into a reference voltage in stationary coordinates;

an adaptation processor coupled to the three-phase to stationary coordinate converter and receiving the output voltage and the reference voltage therefrom, the adaptive portion configured and arranged to provide an estimate of a plurality of pre-selected harmonic components of the inductor current and to provide the estimated plurality of inductor current harmonic components in stationary coordinates;

a control vector processor coupled to the three-phase to stationary coordinate converter and to the adaptation processor, the control vector processor receiving the inductor current, the output voltage, the reference voltage from the three-phase to stationary coordinate converter, and receiving the estimated plurality of inductor current harmonic components and the estimate of the series inductance from the adaptation processor;

the control vector processor including a proportional gain processor, the proportional gain processor configured and arranged to provide a proportional gain term as a function of the inductor current, the output voltage, the reference voltage, and a predetermined inductance value;

the control vector processor further including a harmonic compensator processor, the harmonic compensator processor configured and arranged to use the estimated plurality of inductor current harmonic components to provide a harmonic compensated control signal, the harmonic compensated control signal being a function of the reference voltage, the output voltage, the estimated series inductance, and the estimated plurality of inductor current harmonic components;

the control vector processor providing a control output vector that is a function of the harmonic compensated control signal and the proportional control signal.

12. The controller of claim 11 wherein the proportional gain processor includes;

a first constant multiplied by the inductor current forming a first product value;

a second constant multiplied by the reference voltage forming a second product value;

a first difference module forming a first difference value indicative of the difference between the output voltage and the reference voltage;

a first factor multiplied by the first difference value forming a third product value;

a second difference module providing a proportional gain control signal that is the difference between the sum of the first and second product value and the third product value.

13. The controller of claim 12 wherein the first constant is a first predetermined design constant that is greater than zero.

14. The controller of claim 12 wherein the second constant is one.

15. The controller of claim 12 wherein the first factor is the predetermined series inductance value multiplied by the sum of a first plurality of predetermined design constants, plus a second predetermined design constant, wherein each of the first plurality of predetermined design constants corresponds to one of the pre-selected harmonic components.

16. The controller of claim 12 wherein the harmonic compensator processor is coupled to the first difference module and receiving the first difference value therefrom, the harmonic compensator including a plurality of second order harmonic filters each having a resonant frequency corresponding to one of the predetermined harmonic components, each of the plurality of second order harmonic filters receiving the first difference value and providing a plurality of filtered outputs, the harmonic compensator provides a compensated control signal that is the sum of each of the plurality of filtered outputs, and wherein the control output vector that is the difference between the proportional gain control signal and the harmonic compensated control signal.

17. The controller of claim 11 wherein the predetermined inductance value is greater than a predetermined inductance value.

18. The controller of claim 11 wherein the inductor current module is an inductor current sensor.

19. The controller of claim 11 wherein the inductor current module is an inductor current sensor.

20. The controller of claim 11 wherein the voltage module is a voltage sensor.

21. The controller of claim 11 wherein the voltage module is a voltage estimator.

22. The controller of claim 11 wherein the output current module is an output current sensor.

23. The controller of claim 11 wherein the output current module is an output current estimator.

24. A method for controlling a three-phase uninterrupted power supply (UPS), the three-phase UPS providing power to a three-phase load via a series inductor for each phase and a capacitor connected electrically in parallel to the load for each phase, the three-phase UPS providing a voltage E, an output voltage $v_C$, an inductor current $i_L$, and a load current $i_O$ for each phase, the method comprising the steps of:

determining the inductor current in each phase;

determining the output voltage, $v_C$, in each phase;

converting the determined inductor current and the output voltage from a three-phase system into a inductor current and output voltage expressed in stationary coordinates;

estimating a plurality of pre-selected harmonic components of the inductor current and to provide the estimated plurality of inductor current harmonic components in stationary coordinates;

determining a proportional gain term;

determining a harmonic compensated control signal;

determining a control vector as a function of the proportional gain term and the harmonic compensated control function.

25. The method of claim 24 wherein the step of estimating the plurality of pre-selected harmonic components of the inductor current includes estimating the plurality of pre-selected harmonic components as a function of the output voltage and the reference voltage.

26. The method of claim 24 wherein the function of the the output voltage and the reference voltage is given by $$\frac{d}{dt}\hat{i}^p_{L,k} = -\gamma_k \tilde{v}_C + \Im k\omega \hat{i}^p_{L,k}, \frac{d}{dt}\hat{i}^n_{L,k} = -\gamma_k \tilde{v}_C - \Im k\omega \hat{i}^n_{L,k}.$$

27. The method of claim 24 wherein the function of the the output voltage and the reference voltage is given by
$\hat{I}_{L,k}{}^p = -\gamma_k e^{-\Im\omega k l\tilde{}} \tilde{v}_C, \hat{I}_{L,k}{}^n = -\gamma_k e^{\Im\omega k l\tilde{}} \tilde{v}_C.$ 28. The method of claim 24 wherein the step of determining the proportional gain term and feedforward term includes the equation $$-R_1 i_L - \left(2L_0 \sum_{k \in H} \gamma_k + R_2\right)\tilde{v}_C + v_C^*.$$

29. The method of claim 24 wherein the step of determining harmonic compensated control signal includes the equation $$\sum_{k \in H} 2\gamma_k \tilde{v}_C \left(\frac{R_1 s - k^2 \omega^2 L_0}{s^2 + k^2 \omega^2}\right).$$

30. The method of claim 24 wherein the step of determining harmonic compensated control signal includes the equation $$\sum_{k \in H}\left[(R_1 + \Im k\omega \hat{L})\hat{i}^p_{L,k} + (R_1 - \Im k\omega \hat{L})\hat{i}^n_{L,k}\right].$$

31. The method of claim 24 wherein the step of determining the inductor current includes measuring the inductor current.

32. The method of claim 24 wherein the step of determining the inductor current includes estimating the inductor current.

33. The method of claim 24 wherein the step of determining the output voltage includes measuring the output voltage.

34. The method of claim 24 wherein the step of determining the output voltage includes estimating the output voltage.

35. An apparatus for controlling a three-phase uninterrupted power supply (UPS), the three-phase UPS providing power to a three-phase load via a series inductor for each phase and a capacitor connected electrically in parallel to the load for each phase, the three-phase UPS providing a voltage E, an output voltage $v_C$, an inductor current $i_L$, and a load current $i_O$ for each phase, the apparatus comprising:

an inductor current module operative to provide the inductor current in each phase;

a voltage module operative to provide the output voltage in each phase;

a three-phase to stationary coordinate converter, coupled to the inductor current module and the voltage module, the coordinate converter configured and arranged to convert the measured inductor current and the output voltage from a three-phase system into a inductor current and output voltage expressed in stationary coordinates;

an estimator coupled to the three-phase to stationary coordinate converter, the estimator configured and arranged to estimate a plurality of pre-selected harmonic components of the inductor current and to provide the estimated plurality of inductor current harmonic components in stationary coordinates;

a proportional gain processor coupled to the estimator and the coordinate converter, the proportional gain processor configured and arranged to determine a proportional gain term;

a harmonic control processor coupled to the estimator and the coordinate converter, the harmonic control processor configured and arranged to determining a harmonic compensated control signal;

a control vector processor determining a control vector as a function of the proportional gain term and the harmonic compensated control function.

36. The apparatus of claim 35 further including the three-phase to stationary coordinate converter coupled to a three-phase reference voltage, the coordinate converter configured and arranged to convert the three-phase reference voltage to a reference voltage, and wherein the estimator estimates the plurality of pre-selected harmonic components of the inductor current includes estimating the plurality of pre-selected harmonic components as a function of the output voltage and the reference voltage.

37. The apparatus of claim 35 wherein the inductor current module is an inductor current sensor.

38. The apparatus of claim 35 wherein the inductor current module is an inductor current sensor.

39. The apparatus of claim 35 wherein the voltage module is a voltage sensor.

40. The apparatus of claim 35 wherein the voltage module is a voltage estimator.

* * * * *

UNITED STATES PATENT AND TRADEMARK OFFICE
CERTIFICATE OF CORRECTION

PATENT NO. : 6,940,187 B2
APPLICATION NO. : 10/203950
DATED : September 6, 2005
INVENTOR(S) : Gerardo Escobar et al.

It is certified that error appears in the above-identified patent and that said Letters Patent is hereby corrected as shown below:

Front Page, (75) Inventors, "Padua (IT)" should read --Padova (IT)--;

Column 4, line 26, "a and A" should read --$\alpha$ and $\beta$--;

Column 4, line 67, equation (3), "$\bar{i}_L = i_o + \Im\, \omega C v_c^*$" should read -- $\bar{i}_L = i_o + \Im\, \omega C \hat{v}_c^*$ --;

Column 5, line 39, "$\bar{i}_L = i_o + \Im\, \omega C v_c^*$" should read -- $\bar{i}_L = i_o + \Im\, \omega C \hat{v}_c^*$ --;

Column 5, line 60, "where $\varepsilon_{L,k}^p = \hat{I}_{L,k}^p - \bar{I}_{L,k}^p$ and $\varepsilon_{L,k}^n = \hat{I}_{L,k}^n - \bar{I}_{L,k}^n$" should read -- where $\varepsilon^p_{L,k} = \hat{I}^p_{L,k} - \bar{I}^p_{L,k}$ and $\varepsilon^n_{L,k} = \hat{I}^n_{L,k} - \bar{I}^n_{L,k}$ --.

Column 6, line 10, "$e^{\Im\,\omega kt}$" should read -- $e^{\Im\,\omega kt}$ --;

Column 6, line 11, "$e^{\Im\,\omega kt}$" should read -- $e^{\Im\,\omega kt}$ --;

Column 6, lines 13 and 14, equation (11), "$\hat{i}_{L,k}^p = e^{\Im\,\omega kt}\hat{I}_{L,k}^p$
$\hat{i}_{L,k}^n = e^{\Im\,\omega kt}\hat{I}_{L,k}^n$"

should read -- $\hat{i}^p_{L,k} = e^{\Im\,\omega kt}\hat{I}^p_{L,k}$
$\hat{i}^n_{L,k} = e^{\Im\,\omega kt}\hat{I}^n_{L,k}$ --

Column 7, line 27, "$[(R_1+\Im k\omega\,\hat{L})\hat{i}_{L,k}^p + (R_1-\Im k\omega\,\hat{L})\hat{i}_{L,k}^n]$" should read -- $[(R_1+\Im k\omega\,\hat{L})\hat{i}^p_{L,k} + (R_1-\Im k\omega\,\hat{L})\hat{i}^n_{L,k}]$ --;

Column 8, line 29, equation (21), "$\eta_k^p = -(R_1+k\omega L_o\Im)\hat{i}_{L,k}^p$" should read -- $\eta^p_k = -(R_1+k\omega L_o\Im)\hat{i}^p_{L,k}$ --;

Column 8, line 30, equation (22), "$\eta_k^n = -(R_1+k\omega L_o\Im)\hat{i}_{L,k}^n$" should read -- $\eta^n_k = -(R_1+k\omega L_o\Im)\hat{i}^n_{L,k}$ --;

Column 8, line 36, equation (24), "$\dot{\eta}_k^n = (R_1+\Im k\omega L_o)\gamma_k \tilde{v}_c + \Im k\omega\,\eta_k^n$" should read -- $\dot{\eta}^n_k = (R_1-\Im k\omega L_o)\gamma_k \tilde{v}_c - \Im k\omega\,\eta^n_k$ --; and

UNITED STATES PATENT AND TRADEMARK OFFICE
CERTIFICATE OF CORRECTION

PATENT NO.      : 6,940,187 B2
APPLICATION NO. : 10/203950
DATED           : September 6, 2005
INVENTOR(S)     : Gerardo Escobar et al.

It is certified that error appears in the above-identified patent and that said Letters Patent is hereby corrected as shown below:

Column 13, claim 27, line 55, " $\bar{I}_{L,k}{}^{p}=-\gamma_{k}e^{-\Im k\omega l}\tilde{v}_{C},\bar{I}_{L,k}{}^{n}=-\gamma_{k}e^{\Im k\omega l}\tilde{v}_{C}.$ " should read -- $\bar{I}{}^{p}_{L,k}=-\gamma_{k}e^{-\Im k\omega l}\tilde{v}_{C},\bar{I}{}^{n}_{L,k}=-\gamma_{k}e^{\Im k\omega l}\tilde{v}_{C}.$ --.

Signed and Sealed this

Fourteenth Day of November, 2006

JON W. DUDAS
*Director of the United States Patent and Trademark Office*